May 22, 1951    J. L. SCHRADER    2,553,945
APPARATUS FOR TEMPERING GLASS OBJECTS,
PARTICULARLY PLATE GLASS
Filed Aug. 4, 1941    2 Sheets-Sheet 1
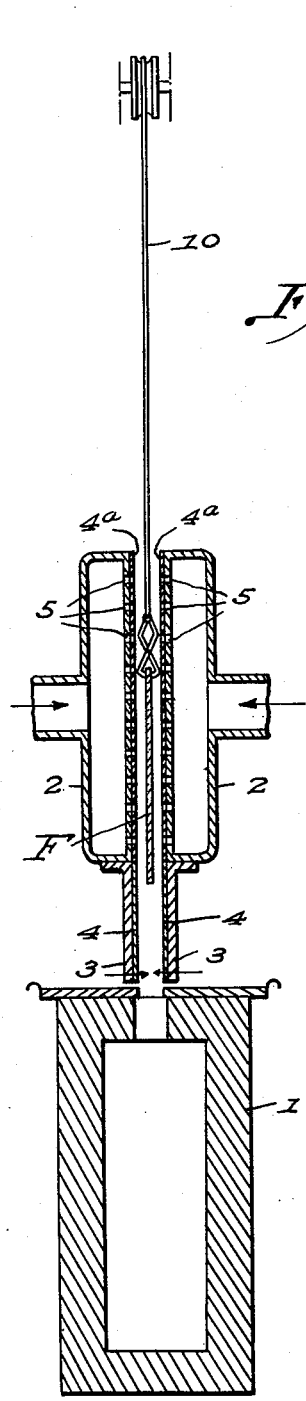
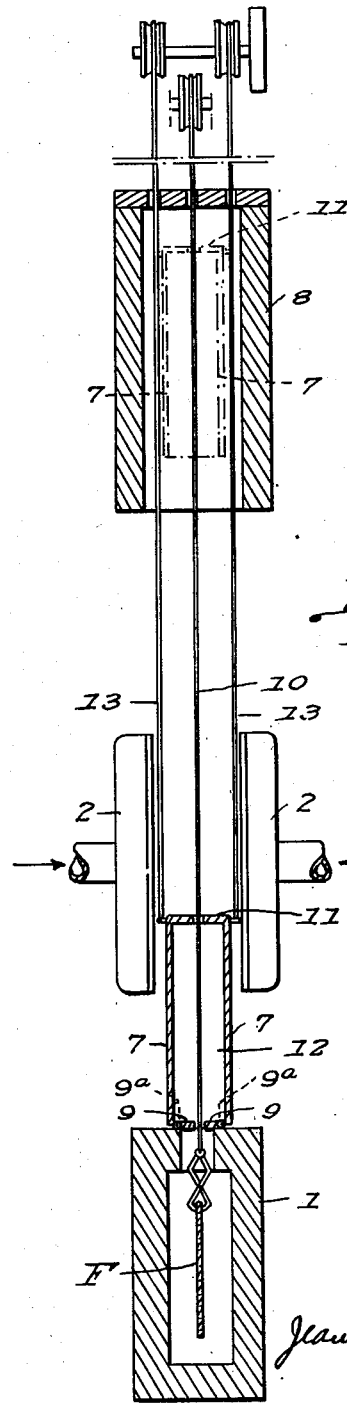
Inventor
Jean Louis Schrader
By Dorsey, Cole & Garner
Attorneys May 22, 1951 J. L. SCHRADER 2,553,945
APPARATUS FOR TEMPERING GLASS OBJECTS,
PARTICULARLY PLATE GLASS
Filed Aug. 4, 1941 2 Sheets-Sheet 2
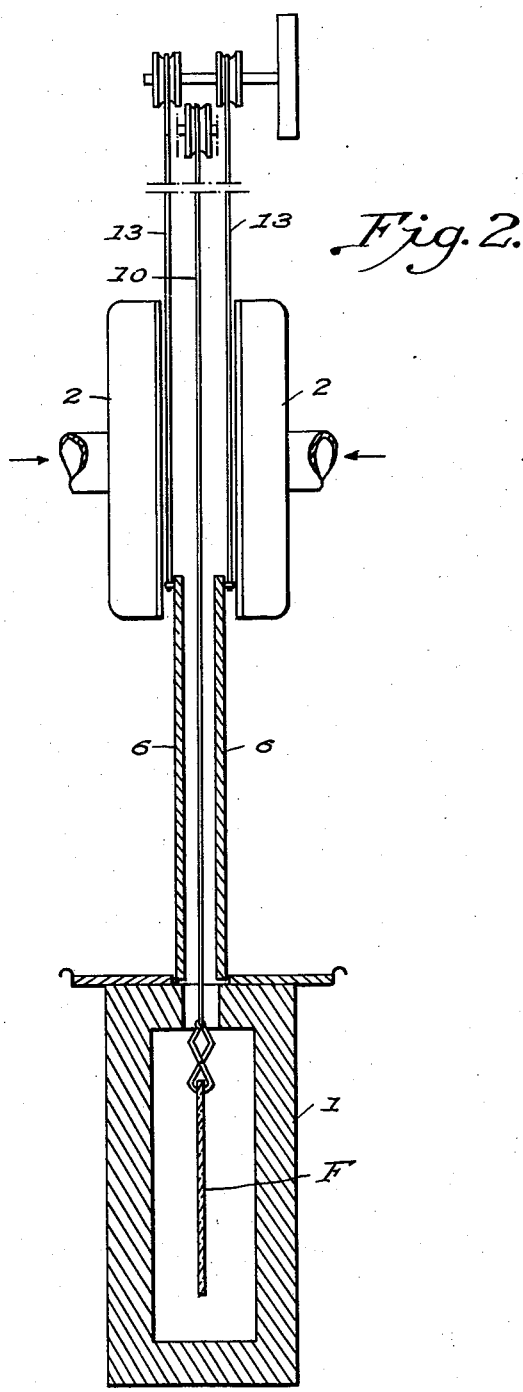
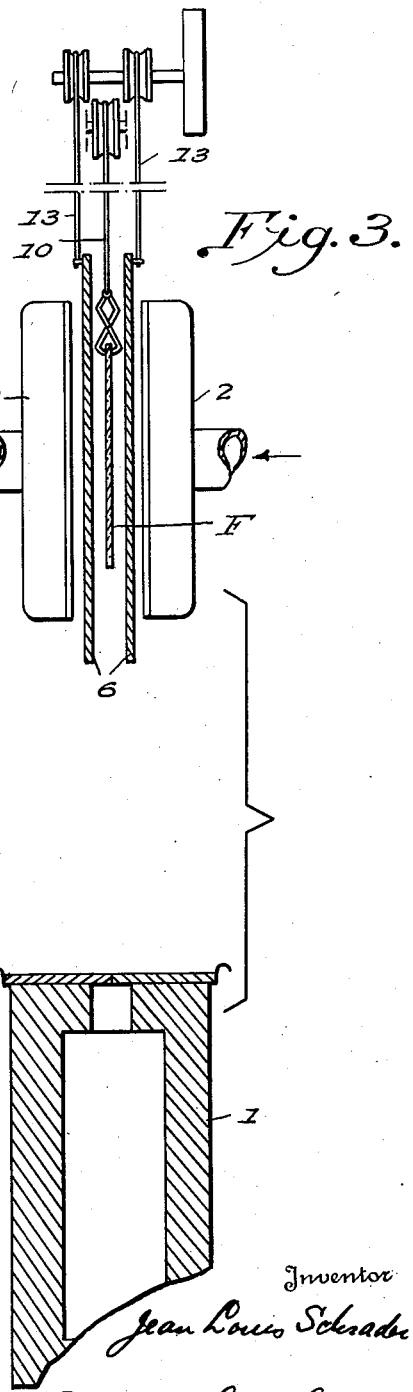
Inventor
Jean Louis Schrader
By Dooley Cole &Garner
Attorneys Patented May 22, 1951

2,553,945

UNITED STATES PATENT OFFICE 2,553,945

APPARATUS FOR TEMPERING GLASS OBJECTS, PARTICULARLY PLATE GLASS

Jean Louis Schrader, Lyon, France, assignor to American Securit Company, Washington, D. C.

Application August 4, 1941, Serial No. 405,411
In France July 13, 1939

Section 1, Public Law 690, August 8, 1946
Patent expires July 13, 1959

1 Claim. (Cl. 49—45)

The present invention relates to apparatus for tempering glass, particularly glass sheets, which includes means for bringing the object to be tempered to a temperature close to that of softening and subjecting it, in this state, to sudden cooling by means of jets of air or other cooling fluids projected on its surface, or by immersion in cooling liquid baths.

In most cases, but more particularly in tempering thin glass sheets, good tempering results require that the cooling be strictly controlled from the instant the object leaves the heating zone, that is, that rational or predetermined cooling for tempering should not be advanced and counteracted by chance cooling not under control of the operator.

It has frequently been observed in this connection that thin glass sheet, which leaves the heating zone and passes through the open air for a distance before being subjected to sudden cooling, often breaks spontaneously.

Particularly, sheets, when very thin, should be subjected to intense preliminary heating, so that the sudden cooling can produce in the object, notwithstanding its slight thickness, the marked differences in tension which characterize the tempering. The sheet leaving the heating zone in an extremely plastic state by reason of its high temperature should be passed to the cooling members with caution, that is, sufficiently slowly so that the transportation will not produce deformation of the plastic mass. However, during this transportation at a slow rate, the sheet undergoes chance or accidental cooling of relatively great duration and which is not under control.

Moreover, if, for the purpose of treating the sheet with caution it is left in a fixed position during the entire treatment, the cooling members must be rapidly substituted for the heating members in front thereof, which, by reason of the material importance of these apparatus, cannot be done without complicating the plant.

By another method, endeavor has been made to protect the object from untimely cooling between the stages of heating and sudden cooling, by providing at the discharge point of the heating members a zone between the cooling members which constitutes a passageway, at the interior of which the sheet can reach the blowing point while being protected from the movements of the air in the shop. This passageway, made of sheet metal, is removed from its initial position, as soon as the sheet has reached the blowing point and at this moment, uncovers the blowing members which may then enter into immediate operation. In practice, however, this arrangement has not proven capable of maintaining the sheet in the thermal state necessary for good tempering for a sufficient period of time because notwithstanding the presence of this protective zone, the plate undergoes considerable cooling.

The present invention is designed to greatly reduce, if not to eliminate, the cooling of the plate between the end of the heating and the beginning of the sudden cooling, while providing the desirable time interval between these two operations.

It consists in maintaining the object, for example, a glass sheet, from the time of its discharge from the furnace and up to the moment in which the cooling members, for example, the blowing elements, enter into operation, between protective surfaces, which by their nature or their temperature, are capable of forming screens to prevent loss of heat by radiation from the sheet, or wherein these surfaces act by reflection to throw back the heat on the sheet which the latter has radiated, or whereby they exert a suitable inherent radiation which neutralizes the radiation of the sheet.

Applicant has, in fact, been able to demonstrate that when a glass sheet has a temperature near its softening point it has great capacity for cooling by radiation, and that this cause of cooling predominates over all other losses of heat, for example, on contact of the sheet with the surrounding air.

This consideration explains the inefficiency of known apparatus as previously described and formed with a passageway of ordinary metal sheet, this material being incapable of preventing losses of heat through radiation from the sheet which is almost at its softening point.

Among the surfaces which, by their nature, are capable of reflecting the heat radiated by the object, some have this property only when they are polished to a high degree, and should necessarily be maintained in this state, such for example as sheet iron, or steel; other surfaces are effective by their very nature, but require careful upkeep to remain unaltered, for example copper. Other metals, on the contrary, are effective without special precautions. Such is the case with aluminum which can be used practically in unpolished state, for example in the form of a coating projected or applied to an ordinary sheet metal body. It is to be understood that use may also be made of surfaces with silvered coatings, with certain precautions for retaining their great reflective capacity. In general, the reflecting capacity considered in the present case is the power of reflecting chiefly the rays emitted by an object carried to a temperature close to its softening point and which are chiefly heat rays.

On the other hand, the protective properties of the surfaces utilizable according to the invention may be due to the fact that they are brought to a temperature close to the softening point of the glass; this temperature of the protective surfaces may be slightly higher than the temperature of the sheet, the essential condition being only that the temperature of these surfaces remain sufficiently constant during the time interval to be provided between the final instant of heating and the initial instant of the cooling, as by blowing.

Use may also be made of surfaces having both of the two above characteristics simultaneously, that is, high reflecting power and suitable temperature.

With respect to the structure, particularly the relative position of these surfaces with respect to the blowing and heating members, it is to be noted that these surfaces may, according to the case, be fixed or movable with respect to these members. In any case it is preferable that the protective surfaces be continuous and parallel with the object and spaced slightly therefrom.

Furthermore, according to an important feature of the invention, certain elements of these surfaces may be identified with the surface of the cooling members, for example in the case of cooling by blowing, and are thus capable of protecting the object from cooling, while the object is located between these members before the cooling is started.

These different characteristics as well as the various possibilities of carrying out the invention will appear from the following specification relative to three tempering plants according to the invention, which are illustrated in the accompanying drawing and wherein:

Fig. 1 is a vertical sectional view of one embodiment of the invention.

Fig. 2 is a vertical sectional view of another embodiment of the invention.

Fig. 3 is a vertical sectional view corresponding to Fig. 2 showing the parts in different operative positions, and Fig. 4 is a vertical sectional view of a third embodiment of the invention.

According to the exemplary embodiment shown in Fig. 1 the heating zone 1 is connected with the cooling members 2, formed by two parallel casings provided with perforations for blowing the air, by a metallic sleeve 3, the inner surfaces of which are covered with a layer of reflecting metal, such as the aluminum coating 4. The inner surface of each casing 2 is itself provided with a similar coating 4a, except of course for the blowing orifices 5.

An advantage of this construction consists in the fact that the existence of protective surfaces does not make it necessary to increase the distance between the origins of the jets or jet openings and the sheet. Thus, this embodiment permits of permanently giving this distance the minimum value compatible with the thickness of the plate F and the members which support it, such minimum value being favorable to good tempering. The supporting members are indicated by the tongs suspended from the cable 10, which may be reeled in a conventional manner.

Figs. 2 and 3 show a modification wherein the reflecting surface consists of two movable plates 6, arranged in pairs, the inner surfaces of which have great reflecting capacity.

At the initial instant of the transfer period these plates occupy the position shown in Fig. 2 and at which time their lower edges are immediately adjacent the discharge opening of the furnace 1. Starting from the instant in which the lower edge of the glass sheet passes beyond this opening, and during the entire transfer of the sheet up to the blowing casings 2, these plates, carried by the suspension cables 13, move synchronously with the sheet, and when the latter reaches its blowing position and is fixed immovably at that point (Fig. 3) these plates continue, but much more rapidly, their movement in the same direction, so as to disengage the sheet completely and allow the cooling air jets free access thereto.

It is, of course, apparent that the plates may be of sufficient height so that they extend over the entire length of the path of the sheet glass, and in such case there is no use to move them during the transfer, their withdrawal taking place then only at the instant in which the sheet is fixed in the cooling position.

By reason of the mobility of the reflecting plates 6, it is possible, with a spare set thereof, to keep them in good condition easily, particularly to maintain their high polish.

According to the construction shown on Fig. 4, use is made of an envelope comprising protective plates 7 which, according to a characteristic feature of the invention, opposes radiations of the glass sheet F, by reason of the fact that it is carried to a temperature near that of the sheet on its exit from the furnace 1.

For this purpose the paired plates 7, the arrangement and movements of which relative to the sheet and to the heating and cooling members are similar to those described with respect to Figs. 2 and 3, are carried, during the time intervals in which they are inactive, into a heating zone 8 where they acquire the desired temperature.

Fig. 4 shows the assembled apparatus in the position which the various members occupy at the moment in which the sheet is on the point of passing from the heating furnace 1. During the heating and up to this moment the upper opening of this furnace is closed by two hinged doors 9, the adjacent edges of which are provided with narrow grooves, notches, or the like, for the passage of the cables 10 supporting the glass sheet F. Before the withdrawal of the glass sheet from the furnace these two doors are raised so as to occupy the position shown in broken lines at 9a, at the interior of the protective plates 7. By reason of the action of the heat to which these doors are subjected while they close off the furnace 1 they themselves constitute the elements protecting the sheet from cooling through radiation during the ascent of the latter, the same as the plates 7.

Instead of heating the protective plates by means of the auxiliary furnace 8 the heating furnace 1 can, in certain cases, be utilized therefor. In this case the protective plates may remain in this furnace 1 together with the object.

As in the case of Figs. 2 and 3 means are provided to operate very rapidly, at the moment in which the blowing is to begin, for withdrawing the protective plates from the field of action of the blowing members 2.

In most cases the apparatus is constructed so that the protection exerted by the plates actually extends over the entire surface of the glass sheet, and in such case the plates are provided with a larger surface than that of the glass sheet; but it is also possible, particularly to protect the vicinity of the edges as well as the edges themselves of the glass sheet, to provide auxiliary protective plates extending perpendicularly to the plane of the glass sheet and opposite the edges thereof. The assemblage of protective plates then forms a more or less closed space encompassing the entire glass sheet.

Such an arrangement is shown by way of example on Figure 4, on which the main protective surfaces 7 are interconnected by an end 11 and the lateral walls 12, the assemblage thus constituting a kind of casing of which only the lower part is left open for the passage of the glass sheet; but it is to be understood that this latter opening may itself be provided with a kind of door, hinged for example, which opens at the moment of the passage of the glass sheet and then closes. By thus constructing the protective walls in the form of a casing closed on most of its surfaces, movements of the air around the glass sheet are avoided, particularly the ascending movement of hot air.

It is to be understood that the invention is also applicable in cases where it is desired to protect only certain parts of the object from cooling by radiation. In this case the protective surfaces are given a form and contour such as to exert action only on the parts to be protected.

All these devices, which moreover can be combined, are adapted to maintain the glass sheet, at least in the desired parts, in the thermal state which is had at the end of the heating, and this for a sufficient interval of time so that it is no longer necessary to operate very rapidly either for transferring the glass sheet to the blowing members, or for substituting the latter for the heating members. It is thus possible to avoid subjecting the glass sheet to more or less sudden movement capable of producing deformations, or of moving relatively heavy members rapidly.

The manufacture of tempered glass sheet is thus facilitated and it is possible to realize under practical conditions the tempering of very thin glass, for example 3 mm. thick and less.

*Summary*

This invention relates to:

(1) Improvement in apparatus for tempering glass objects, particularly glass sheet wherein the object, after having been brought to a temperature close to the softening point, is subjected to sudden cooling, said improvement consisting in means for maintaining the object, from its exit from the furnace and up to the moment in which the sudden cooling enters into action, between protective surfaces which, by reason of their nature or their temperature, are capable of forming screens to prevent heat losses by radiation from the object, or wherein the surfaces act by reflection to pass back the heat radiated from the object, or whereby they exert a suitable inherent radiation which neutralizes that of the object.

(2) Various means for carrying out such improved process having the following characteristics alone or combined:

(a) The protective surfaces are selected from those to which a high degree of polish imparts the capacity of reflecting heat rays;

(b) These protective surfaces have the capacity of reflecting heat rays by reason of the character of the substance forming these surfaces, for example aluminum;

(c) The surfaces are brought to a temperature close to that of the object on its exit from the furnace, this temperature being communicated to said surfaces during periods in which they do not protect the object, or by remaining in an auxiliary furnace, or by being introduced into the furnace which heats the object;

(d) Where the objects are suddenly cooled by blowing certain walls of the blowing members are constructed so as themselves to form screens for preventing heat losses by radiation from the object;

(e) The action of the protective surfaces is limited to certain regions of the object.

What is claimed is:

In a device for tempering glass sheets, the combination of a heating furnace for the glass, cooling heads, an envelope capable of enclosing the glass, an envelope heating chamber and means for shifting the heated glass from the furnace into the envelope, moving the envelope with the enclosed glass to a position between the blowing heads and for moving the envelope from around the sheet while between the blowing heads into the envelope heating chamber.

JEAN LOUIS SCHRADER.

REFERENCES CITED

The following references are of record in the file of this patent:

UNITED STATES PATENTS

| Number | Name | Date |
|---|---|---|
| 1,514,122 | Archer | Nov. 4, 1924 |
| 1,595,103 | Kingsley | Aug. 10, 1926 |
| 1,951,950 | Rising | Mar. 20, 1934 |
| 1,981,450 | Littleton | Nov. 20, 1934 |
| 2,009,748 | Sherwood | July 30, 1935 |
| 2,026,165 | Goodwillie | Dec. 31, 1935 |
| 2,042,521 | Ford | June 2, 1936 |
| 2,188,401 | Crowley | Jan. 30, 1940 |
| 2,194,730 | Wilson | Mar. 26, 1940 |
| 2,194,760 | Long | Mar. 26, 1940 |

FOREIGN PATENTS

| Number | Country | Date |
|---|---|---|
| 3,093 | Great Britain | 1877 |
| 406,606 | Great Britain | Mar. 1, 1934 |
| 806,206 | France | Sept. 21, 1936 |
| 828,647 | France | Feb. 21, 1938 |
| 831,353 | France | June 7, 1938 |
| 112,340 | Australia | Jan. 14, 1941 |
| 541,554 | Great Britain | Dec. 2, 1941 |